Figure 1:
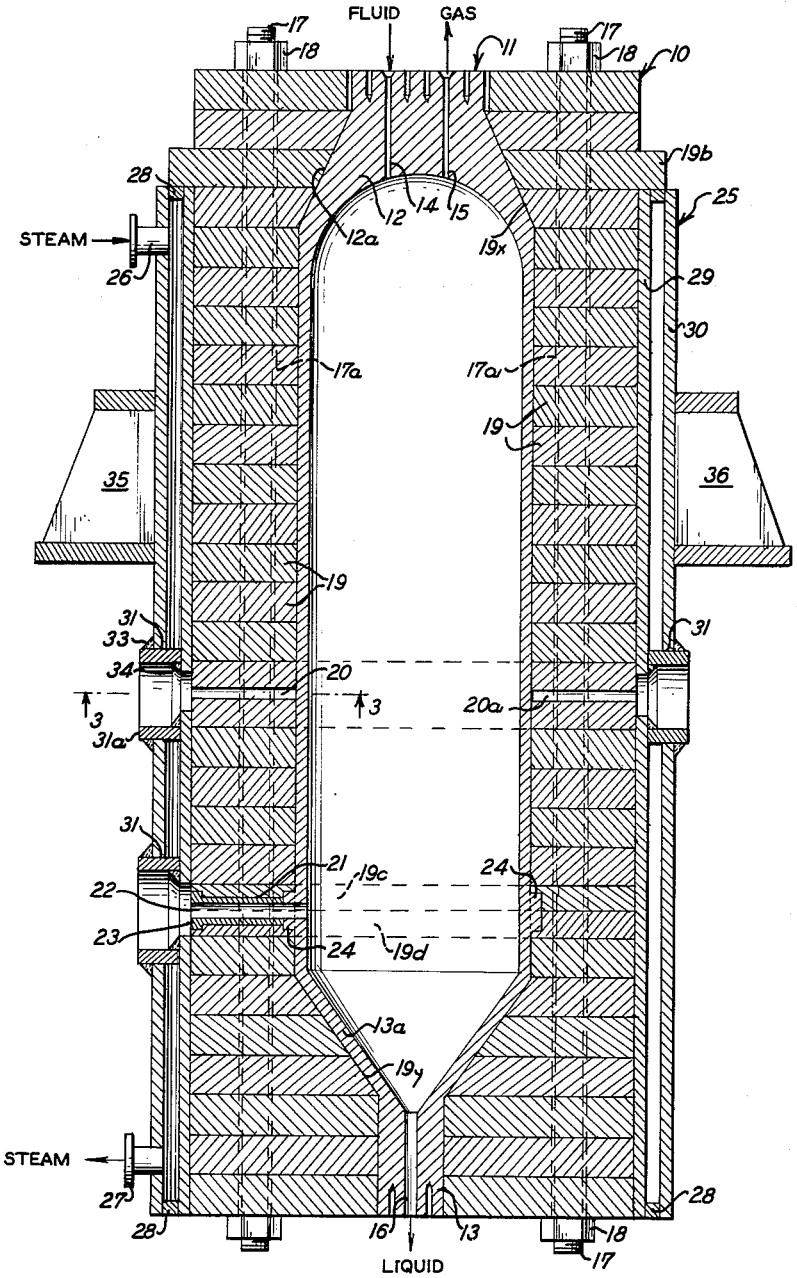

June 14, 1966  O. A. PETERSON  3,256,069
HIGH PRESSURE VESSEL
Filed Sept. 26, 1963  3 Sheets-Sheet 1

INVENTOR
OSCAR ALBERT PETERSON

BY William C. Long
ATTORNEY

June 14, 1966  O. A. PETERSON  3,256,069
HIGH PRESSURE VESSEL
Filed Sept. 26, 1963  3 Sheets-Sheet 2

INVENTOR
OSCAR ALBERT PETERSON
BY William C. Long
ATTORNEY

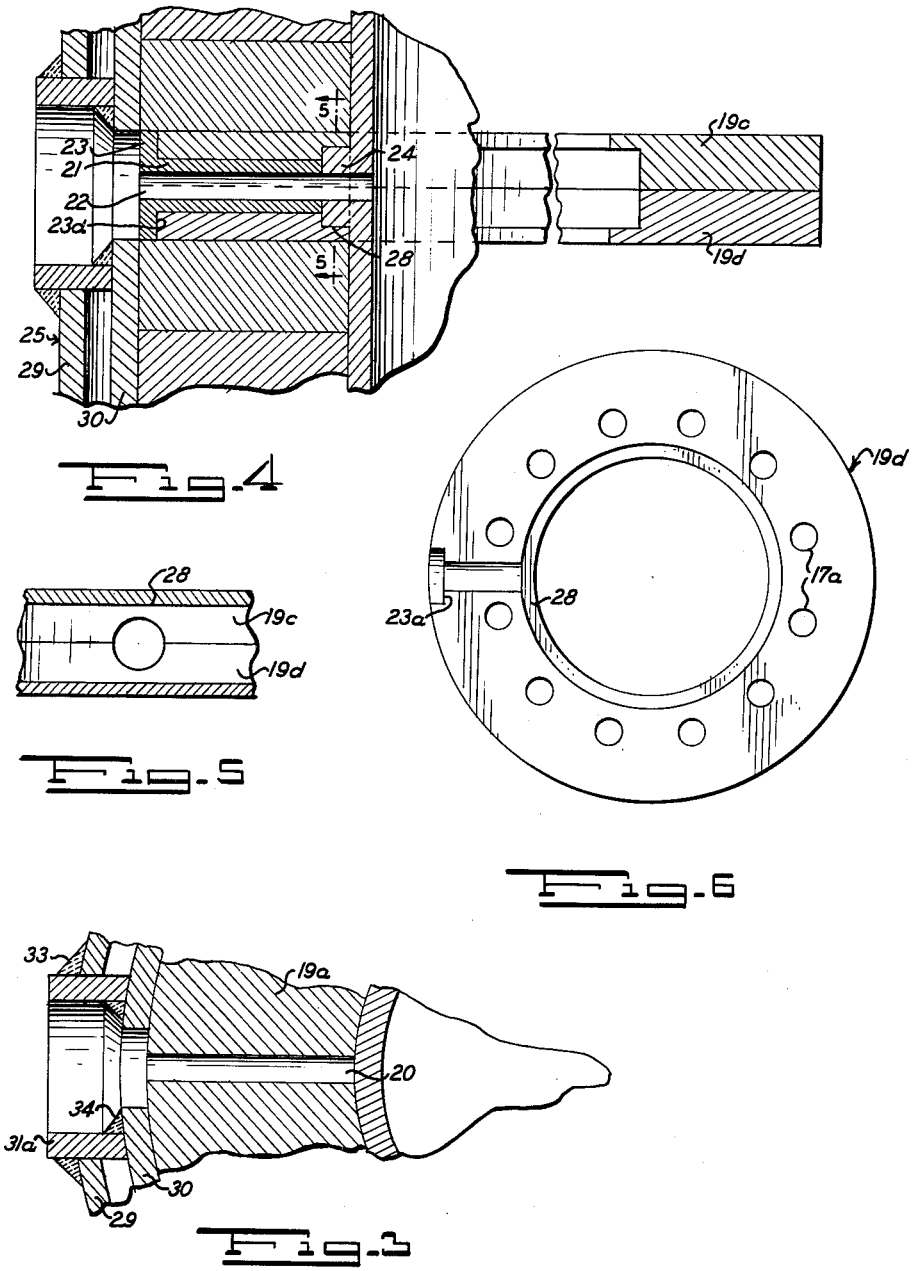

United States Patent Office 3,256,069
Patented June 14, 1966

3,256,069
HIGH PRESSURE VESSEL
Oscar Albert Peterson, Westwood, N.J., assignor to Halcon International, Inc., a corporation of Delaware
Filed Sept. 26, 1963, Ser. No. 311,745
2 Claims. (Cl. 23—289)

This invention relates to apparatus suitable for use in chemical processes involving fluids under high pressure and temperature conditions, more particularly to a thick walled vessel for such apparatus provided with inlet and outlet means, which vessel is made up of an inner vessel surrounded by a plurality of ring members adapted to support the inner vessel against deformation in service. The inner vessel is cylindrical in shape and the supporting members are plates each provided with a circular opening adapted to fit snugly around the cylindrical vessel. The plates are provided with a plurality of holes and the assembly is provided with a plurality of bolts or members passing through these holes. Such vessels may withstand internal pressures of 1000 or more atmospheres. Also, such vessels are adapted to accommodate a contiguous heat-exchange means.

The ends of the inner vessel may be of convenient shape and the end supporting plates are fitted to the ends of the vessel. The plates provide support for the vessel against radial deformation, and the bolts provide support for the vessel and assembly against longitudinal deformation.

High pressure vessels are used in many commercial processes and have been made up in any of several known ways. The vessel may be in the form of a closed cylinder having very thick walls. It may be made by forging or by wrapping and welding a plurality of concentric layers around an inner vessel. Also, it may be made by winding strip or wire around an inner vessel. These and analogous methods require very heavy manufacturing equipment of limited availability. Moreover, major repairs thereto are not readily made. In addition, transportation may be impractical for a vessel of very large size. The art is confronted by the problem of providing such vessels in a more convenient manner and which vessels avoid one or more of these drawbacks.

The fluid mixture to be processed may require maintenance under high pressure and temperature conditions, such as an ethylene polymerization reaction mixture containing gaseous ethylene as well as liquid copolymer which is separated at a pressure of about 4,000 to 15,000 p.s.i.g. and a temperature of about 200° to 575° F. Such a vessel has to be supplied with means for initially providing and maintaining this temperature; i.e., to prevent radiation heat loss. This is an additional problem faced by the art.

The discoveries associated with the invention and relating to solution of the above problems, and the objects achieved in accordance with the invention as set forth herein include the provision of:

An apparatus adapted for processing material at elevated pressure comprising a circular inner vessel provided with feed means and draw-off means and surrounded by a plurality of washer-like plate members and end members in contact therewith and adapted to support said vessel against radial deformation, said plate members and end members being held together by tie rod members passing through said plate members and adapted to support said vessel and the assembly against longitudinal deformation;

Such an apparatus provided with fluid feed means and gas draw-off means near the upper end thereof and liquid draw-off means near the lower end thereof;

Such an apparatus adapted to be disassembled by removing the bolt and nut members and the plate members for replacement of the inner vessel;

Such an apparatus in which the inner vessel is provided with a side connection intermediate its ends, a ring-like reinforcing section integral with said inner vessel at the region of the side connection, the side connection being set in a semi-circle groove in the two plates which meet in the central, longitudinal, horizontal plane of the side connection;

Such an apparatus provided with an annular heating jacket means contiguous with and in contact with the outer edge of a plurality of the plate members and free to move relative to said members under the influence of temperature differences between the jacket and the plate members, said heating jacket being provided with heating fluid inlet and outlet means;

Such an apparatus wherein the jacket is made up of an inner wall and an outer wall, each end of the jacket being provided with an annular spacer, and the edge of the walls being attached to the spacer at each end;

Such an apparatus provided with at least one pair of ports arranged along the vessel for introducing and detecting radiation for determination of liquid level in the vessel and with passages in the jackets means adjacent to each of the ports of the vessel and wherein each of the jacket passages includes a sleeve passing through an opening in the outer wall and set on the inner wall, the inner wall opening being smaller than the outer wall opening, the internal opening being large enough to permit access through the contiguous port along the vessel, the sleeve being attached to each of the walls at its contact points therewith;

Such an apparatus in which the inner vessel is provided with a side connection intermediate its end provided with a port in the heating jacket means to accommodate said side connection;

Such an apparatus wherein each end of the inner vessel is provided with a heavy conical end section adapted to be supported by appropriately shaped plates;

Such an apparatus wherein each of the heavy end sections contains at least one of the feed means and the draw-off means;

Such an apparatus wherein the upper end section contains a fluid feed means and a gas outlet means;

Such an apparatus provided with a removable plug at one end thereof.

Such an apparatus wherein the upper end of the inner vessel is provided with a shoulder and sleeve opening to accommodate a matching plug, the shoulder region being provided with gasket sealing means;

Such an apparatus provided with threaded plug clamping means;

Such an apparatus provided with an annular heating jacket means contiguous with and in contact with the outer edge of a plurality of the plate members and free to move relative to said members under the influence of temperature differences between the jacket and the plate members, said heating jackets being provided with heating fluid inlet and outlet means. The jacket being made up of an inner wall and an outer wall, each end of the jacket being provided with an annular spacer, and the edge of the walls being attached to the spacer at each end, the jacket being provided with at least one pair of ports arranged along the vessel for introducing and detecting radiation for determination of liquid level in the vessel and with passages in the jacket means adjacent to each of the ports of the vessel and wherein each of the jacket passages includes a sleeve passing through an opening in the outer wall and set on the inner wall, the inner wall opening being smaller than the outer wall opening, the internal opeing being large enough to permit access through the contiguous port along the vessel, the sleeve being attached to each of the walls at its contact points therewith;

And other objects which will be apparent as details or embodiments of the invention are set forth hereinafter.

Figure 2:
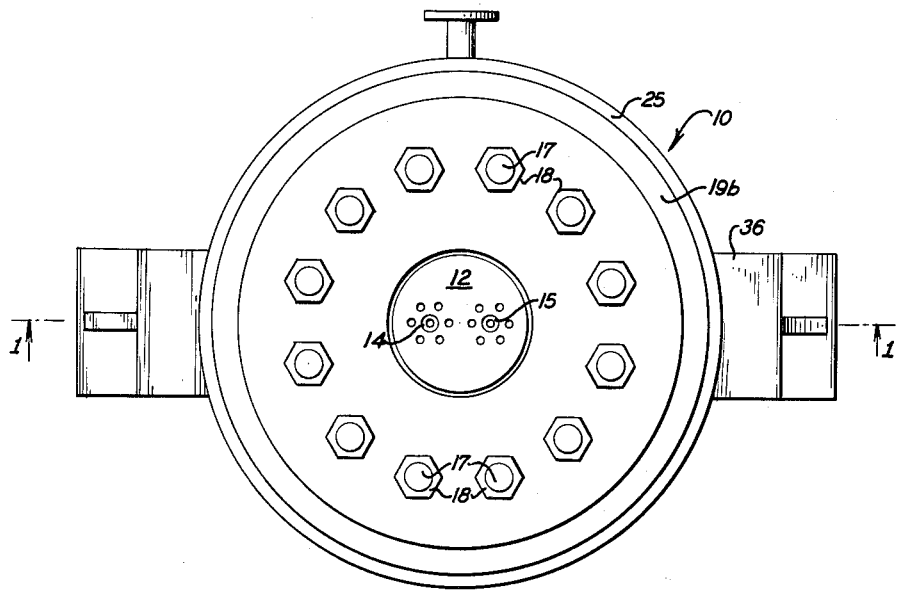
Figure 7:
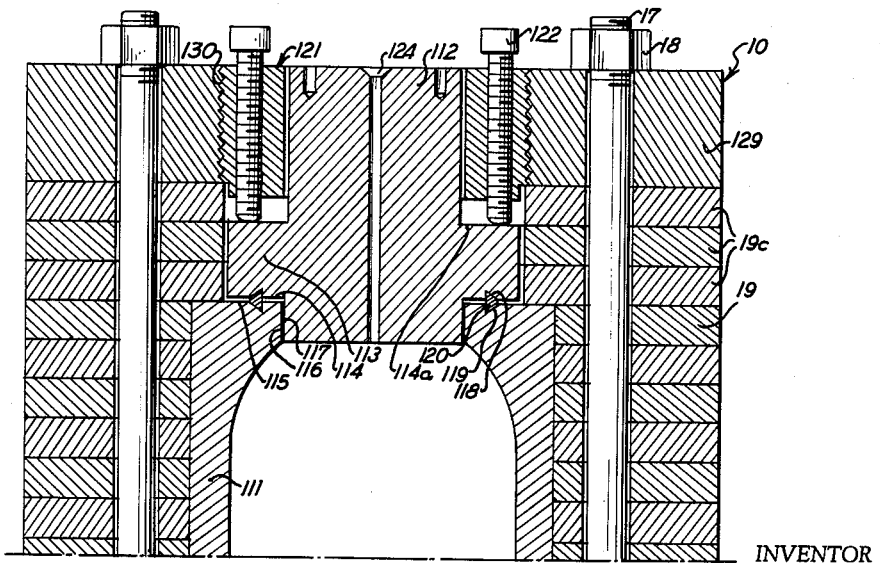

In the accompanying drawings, FIGURE 1 is a cross section view of an apparatus in accordance with the invention, and FIGURE 2 a top plan view thereof. FIGURE 3 is an enlarged view of the radiation device portholes as well as the access openings thereto in the steam jacket along section 3—3 of FIGURE 1. FIGURE 4 is an enlarged view of the side connection thereof. FIGURE 5 is an inside elevational view of the side connection. FIGURE 6 is a top plan view of a plate adjacent to the side connection. FIGURE 7 is a modification of of the top part of the embodiment of FIGURE 1 showing a removable plug.

In order to indicate still more fully the nature of the present invention, the following examples of typical embodiments are set forth, it being understood that these examples are presented as illustrative only and they are not intended to limit the scope of the invention.

*Example 1*

Referring to FIGURES 1 and 2, the apparatus 10 is provided with an inner vessel 11 having a thickened upper section 12, the outer part of which is partly conical in shape at 12a, and also a lower section 13 the outer part of which is partly conical in shape at 13a. It is provided with fluid inlet means 14 and gas outlet means 15 in the upper end, and liquid outlet means 16 in the lower end. A number of bolts or tie rods 17 and nuts 18 are provided, the bolts passing through holes 17a in the washer plates 19. The inner opening of the plates is such as to contact the outer wall of the inner vessel, including 19x and 19y at the conical region. The plates are arranged in a "laminannular" assembly or arrangement. Optionally, the apparatus is provided with one or more pairs of ports for introducing radiation from a radioactive source such as Cobalt 60 and for passing out and detecting radiation, a pair being shown by 20 and 20a. The ports are provided by drilling an appropriate size opening or hole horizontally through the mid-section of one of the plates 19a as shown in some detail in FIGURE 3. The plates may be of equal thickness, but need not be. Also, the plates may be as thick as convenient, e.g. of one or two inches or more.

Optionally, the vessel may also be provided with a side draw-off means which includes the tube 21 having an outer flange 23 and an opening 22. The tube is welded to a reinforced ring member 24 which is integral with the inner vessel and is wider than the tube. As shown in detail in FIGURES 4, 5 and 6, the tube is set in a semi-circular groove in each of the two plates 19c and 19d which meet at the horizontal cross-sectional plane of the tube. The plates 19c and 19d and the ring 24 are sized at their meeting surfaces so that the plates will provide support against horizontal deformation of the vessel at the region of contact. The ring fits into a "step-cut" in the plates, but if desired, the size of the ring (lengthwise) may be such as to equal the thickness of the two plates and thereby avoid this cut. The plates are provided with recesses 23a to accommodate the flange 23 (set in so the heat exchanger may slide over it during assembly, and provided with threaded holes not shown for coupling).

The apparatus is provided with fluid heat exchange jacket 25 having a steam inlet means 26 and outlet 27. The walls 29 and 30 are spaced and sealed by members or spacers 28 to which the walls are welded. There is one of such spacers at the bottom and also one at the top. The inner jacket wall 29 is in contact with the outer edges of the plates but free to move relative thereto. Plate 19b overhangs the top of the jacket. The jacket is provided with a series of passages 31 arranged to provide access holes or ports in the apparatus or for passage of a side draw-off connection. The passages include tubular member 31a which goes through wall 30 and sets on wall 29. The tube is attached to said walls by means of welds 33 and 34. The outer wall 30 is optionally also provided with support means 35 and 36.

FIGURE 7 shows a modification of the apparatus having a removable plug or top section, to provide access to the inside of the vessel. This permits removal of solid material (catalyst, residue, or the like), inspection and if desired reconditioning of the inner surface, and insertion of the solid material in any desired arrangement. It is similar to that of FIGURE 1 except for the upper part including the removable plug 112, having the enlarged section 113 with shoulder 117, the matching surface 114, and clamping surface 114a. The upper part of the inner vessel 111 is thickened and provided with sleeve or opening 116, and support surface 115. A close fit is preferred for the shoulder 117 in opening 116 to maintain the plug in desired alignment. The plug and the vessel are provided with gasket grooves 118 and 119, for gasket 120 (of known type such as a delta gasket or an equivalent). The top plate 129 is relatively thick or heavy and provided with threaded bore 130. Ring 121 is threaded to fit bore 130 and provided with a plurality of setting bolts or studs 122, to take up slack on the gasket 120. The plug is provided with fluid inlet 124 and may have other openings or connections, as desired.

In this modification, the inner vessel and plates are assembled (plates 19c and 129 set in place last, and tightly bolted). Then the gasket is placed in the groove therefor and the plug inserted. Finally, the ring is threaded in place, and the studs tightened.

In the other modifications, the assembling operation is in analogous sequence, starting with the lower plate and working up to the top, followed by tightly bolting the assembly. If a side draw-off is included, the assembling involves arranging the lower plates including plate 19c, setting the vessel in place with the side tube in the appropriate groove, setting the plate 19d in place, and continuing with the others.

In an alternate (not shown) the side tube may extend beyond the heat-exchange jacket, and the latter made in two independent cylindrical sections which meet at the side tube. The steam may flow through the upper section and then through the lower section by coupling the outlet of the former to the inlet of the latter.

Instead of, or in addition to the side draw-off means, the apparatus may be provided with one or more downcomers from the upper end, or one or more risers from the lower end of the inner vessel (not shown).

An important feature of the invention is that it permits using desired materials or alloys for the inner vessel which may be resistant to chemicals which may be treated therein. It also permits using plates of high strength material which may be machined and fitted to support the inner vessel without welding. In this way, undesirable strains or weak spots are avoided.

The outer side of the inner vessel is machined or otherwise brought to substantial circularity of the desired diameter. Preferably the outer surface of the ends is partly conical and thickened, giving the proper profile for support by the juxtaposed plates (which plates are machined to match the conical surface).

The bulk of the strength of the completed construction is in the plates, each being machined or otherwise made in the desired circular shape with the central hole which closely fits the outer surface of the inner vessel. These plates are placed around and in sufficient number to completely surround the inner vessel. By this means, the load imparted by the pressure in the inner vessel is transferred to the plates. The longitudinal component of the pressure load is constrained by an appropriate number of rods or bolts passing through the prepared holes in the plates and being secured at the ends of the rods by means of a mechanical device such as threads and nuts or equivalent means.

The pressure-tight inner vessel may be made of any of the usual materials or special alloys. The holes through the plates are preferably equidistant from each other, and from each side of the plate, and each is centered on a fixed radius from the center of the vessel. In determining radial thickness of metal to be used, only that part of the metal plate which is circumferentially intact is taken into accounts. The plates may be of any conventional metallic material or may be of any alloy especially heat treated to obtain high strength. The tie rods or bolts are of high strength material. The inner vessel is of sufficient strength to withstand slightly elevated pressures. The desired total thickness of metal is determined in known manner. The outer parts of the ends of the inner vessel are preferably conical to give balanced load distribution, but other shapes are operative, including hemispherical, parabolic, flat, and the like. The inner part of the inner vessel should be funnel shaped or the like at the bottom and may be flat, curved, conical or the like at the top.

The inner vessel may be removed and replaced if damaged through corrosion by disassembling the apparatus and installing a new inner vessel.

The vessel may be assembled and tested at the point of manufacture and then disassembled for shipment. The final assembly can then be readily made at the point of use. This is a most important advantage for extremely heavy equipment of this type which is to be used in distant locations which are not readily accessible by heavy transport means.

During startup of a plant including this vessel, such as a plant for making polyethylene from ethylene, the vessel is brought up to temperature by passing steam through the jacket. This is accomplished efficiently in accordance with the invention without any buckling or the like problems, even though the bellows means of prior suggestions is avoided. The tube walls of the annular steam jacket expand together and the inner wall is free to move lengthwise relative to the outer edge of the plates without restraint.

The present apparatus completely avoids the problem of welding caps or covers for the radioactive radiation means, which may be set near or in ports 20, as was called for in prior suggestions. This facilitates location and use of automatic or semi-automatic means for introducing or retracting the radiation source into or from the bottom of the port.

A reaction mixture of ethylene and polyethylene prepared in known manner may be separated in the vessel at a pressure of about 2,500 to 15,000 p.s.i.g. and a temperature of about 200° to 575° F. This reaction mixture may be prepared in accordance with the reaction conditions set forth in U.S. Patent 2,852,501. The liquid polymer is allowed to build-up to the level of a port arrangement and then the valve may be opened until the level is lowered, and the procedure is repeated. If the rate of feed to the vessel is appropriately regulated, the liquid draw-off may be continuous, the level of the liquid in the vessel being maintained above the lower part of the vessel but below the port arrangement. Two or more pairs of port arrangements may be used as desired, instead of the shown one in FIGURE 1.

In view of the foregoing disclosures, variations and modifications thereof will be apparent to one skilled in the art, and it is intended to include within the invention all such variations and modifications except as do not come within the scope of the appended claims.

What is claimed is:

1. Readily disassembled and assembled apparatus for processing material at elevated pressure comprising an inner cylindrical vessel having sides and ends, a plurality of annular reinforcing sections mounted one atop the other concentrically surrounding and in contact with the outer surface of the sides of the vessel and the sides of the ends of the vessel when in use under pressure sufficient to cause deformation, each annular reinforcing section having a plurality of bores parallel to the sides of the vessel, the bores being in alignment, a rod member disposed within each of the aligned bores and extending beyond said bores, and means affixed to the ends of the rods for compressing the annular reinforcing sections into fixed relationship whereby the annular reinforcing sections provide support for the vessel against radial deformation and the rod members provide support against longitudinal deformation.

2. The aparatus of claim 11 wherein said rod members are threaded at at least one end to receive a nut.

References Cited by the Examiner

UNITED STATES PATENTS

| 1,896,245 | 2/1933 | Nagel | 196—133 |
| 1,962,168 | 6/1934 | Andrus | 196—133 X |
| 2,329,970 | 9/1943 | Zimmerman | 196—133 X |
| 2,360,391 | 10/1944 | Birchall | 220—3 |
| 2,424,449 | 7/1947 | Gasche | 23—290 X |
| 2,933,214 | 4/1960 | Douyard | 220—83 X |
| 3,041,152 | 6/1962 | Christensen | 23—290 |

FOREIGN PATENTS 715,330   12/1941   Germany.

MORRIS O. WOLK, *Primary Examiner.*

JAMES H. TAYMAN, JR., *Examiner.*

J. J. MULLEN, J. SCOVRONEK, *Assistant Examiners.*